United States Patent [19]

Yoshida et al.

[11] 4,202,806

[45] May 13, 1980

[54] STABILIZATION OF CHLORINE-CONTAINING RESINS

[75] Inventors: Norio Yoshida, Hirakata; Takesi Matuyama, Sakai, both of Japan

[73] Assignee: Koei Chemical Co., Ltd., Osaka, Japan

[21] Appl. No.: 898,286

[22] Filed: Apr. 20, 1978

[30] Foreign Application Priority Data

| Apr. 22, 1977 | [JP] | Japan | 52-46968 |
| Apr. 22, 1977 | [JP] | Japan | 52-46969 |
| May 23, 1977 | [JP] | Japan | 52-60019 |
| Feb. 28, 1978 | [JP] | Japan | 53-23101 |

[51] Int. Cl.$^2$ .................. C08K 5/11; C08K 5/12
[52] U.S. Cl. .................. 260/23 XA; 260/45.85 T; 260/45.85 P; 260/45.85 R; 260/45.85 V
[58] Field of Search ............ 260/31.6 R, 31.8 R, 260/45.85 R, 45.85 T, 45.85 P, 410.6, 45.85 V; 560/90, 91, 198, 112; 568/853

[56] References Cited

U.S. PATENT DOCUMENTS

| 2,459,746 | 1/1949 | Radcliffe | 260/31.4 R |
| 2,462,047 | 2/1949 | Wyler | 260/410.6 |
| 2,711,401 | 6/1955 | Lally | 260/45.75 W |
| 2,943,070 | 6/1960 | Hecker et al. | 260/45.95 L |
| 2,945,830 | 7/1960 | Kraft | 260/410.6 |
| 2,975,152 | 3/1961 | Hurwitz et al. | 260/410.6 |
| 3,000,917 | 9/1961 | Babayan | 260/410.6 |
| 3,637,501 | 1/1972 | Malec et al. | 560/90 |
| 3,953,358 | 4/1976 | Sjogreen | 260/23 XA |

Primary Examiner—V. P. Hoke
Attorney, Agent, or Firm—Armstrong, Nikaido, Marmelstein & Kubovcik

[57] ABSTRACT

Stabilizers for chlorine-containing resins, derived from pentaerythritol and/or polypentaerythritols, which comprises at least one member selected from (1), a dehydration condensation product of pentaerythritol or polypentaerythritol, (2) a partial esterification product of pentaerythritol, polypentaerythritol or the dehydration condensation product with an aliphatic polybasic acid, (3) a partial esterification product of polypentaerythritol or the dehydration condensation product with an aromatic mono- or poly-basic acid, and (4) a partial esterification product of pentaerythritol, polypentaerythritol or the dehydration condensation product with an aliphatic or aromatic polybasic acid and a higher fatty acid. The stabilizers have the excellent effect of stabilizing chlorine-containing resins, and particularly the combination use with known organic zinc salt stabilizers brings excellent results.

11 Claims, No Drawings

STABILIZATION OF CHLORINE-CONTAINING RESINS

BACKGROUND OF THE INVENTION

The present invention relates to novel stabilizers for chlorine-containing resins, and more particularly to stabilizers derived from pentaerythritol and/or polypentaerythritol for improving the heat stability of chlorine-containing resins.

It is well known that chlorine-containing resins, particularly polyvinyl chloride resins are unstable to heat and light and are colored or deteriorated by heat on processing. In order to minimize such coloration and deterioration due to heat and light, various stabilizers such as lead-, calcium-, zinc- and tin-stabilizers have been developed and used. However, in recent years environmental pollution by toxic heavy metals has become a social problem, and particularly the use of stabilizers having an excellent effect such as lead and cadmium stabilizers has been limited or regulated. Although the lead and cadmium stabilizers are being gradually replaced by nontoxic calcium-zinc, barium-zinc, and magnesium-zinc stabilizers, the effect of these nontoxic stabilizers is not so good as lead and cadmium stabilizers in substance. That is to say, the heat resisting effect of these nontoxic stabilizers is far inferior to that of the lead or cadmium stabilizers.

In order to provide stabilizers which have an excellent effect and are nontoxic, various attempts have been made, but no satisfactory stabilizer has been reported. It is known that polyols such as pentaerythritol, trimethylolpropane and neopentyl glycol have an effect as an auxiliary thermal stabilizer for chlorine-containing resins. However, these polyols have the disadvantages in their high water-solubility, sublimation and compatability at processing temperatures with resins. Although pentaerythritol and dipentaerythritol, tested in PL Standards, C-14-(10) of Japan Hygienic PVC Association, have a relatively low solubility in water and are known to be nontoxic, they have a high melting point and do not melt at a temperature of processing chlorine-containing resins. The compatibility with the resins is so poor that they are not dissolved in processed articles and decrease mechanical strength of articles.

SUMMARY OF THE INVENTION

The present invention provides novel stabilizers having the excellent stabilizing effect on chlorine-containing resins, derived from pentaerythritol and/or a polypentaerythritol, which comprises at least one member selected from the group consisting of (1) a dehydration condensation product of pentaerythritol and/or a polypentaerythritol (hereinafter referred to as "condensation product"), having a hydroxyl content of 20% to 40% by weight as defined after, (2) a partial esterification product, having a hydroxyl content of 10% to 40% by weight, of at least one polyol selected from the group consisting of pentaerythritol, polypentaerythritols and the condensation products, with an aliphatic polybasic acid, (3) a partial esterification product, having a hydroxyl content of 10% to 40% by weight, of at least one polyol selected from the group consistng of polypentaerythritols and the condensation products, with an aromatic mono- or polybasic acid, and (4) a partial esterification product, having a hydroxyl content of 10% to 40% by weight, of at least one polyol selected from the group consisting of pentaerythritol, polypentaerythritols and the condensation products, with an aliphatic or aromatic polybasic acid and a higher fatty acid.

DETAILED DESCRIPTION

The stabilizers of the present invention are applicable to chlorine-containing resins such as homopolymers of vinyl chloride or vinylidene chloride and copolymers of vinyl chloride and other olefins, and have the excellent stabilizing effect particularly on polyvinyl chloride. The stabilizers of the present invention also have a good compatability which chlorine-containing resins.

The term "hydroxyl content" as used herein is represented by the following equation.

Hydroxyl content (% by weight) =

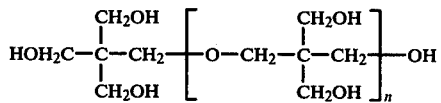

Pentaerythritol and polypentaerythritols such as dipentaerythritol and tripentaerythritol are employed as the starting polyol for preparing the condensation product of the present invention. The dehydration reaction is carried out in a usual manner. For instance, pentaerythritol and/or a polypentaerythritol is subjected to dehydration reaction in the absence or presence of a solvent and in the absence or presence of acid catalyst, e.g. mineral acids such as phosphoric acid and sulfuric acid, organic acids such as alkylbenzenesulfonic acids, and Lewis acids such as tin chloride and magnesium chloride, or a base catalyst, at an elevated temperature, e.g. at a temperature of 200° to 270° C. Pentaerythritol and polypentaerythritols may be employed alone or in admixture thereof.

The thus obtained dehydration condensation product is a mixture of the unreacted starting polyol and the condensed polyols.

The condensed polyols contain polyols represented by the following general formula:

$$HOH_2C-\underset{\underset{CH_2OH}{|}}{\overset{\overset{CH_2OH}{|}}{C}}-CH_2\left[-O-CH_2-\underset{\underset{CH_2OH}{|}}{\overset{\overset{CH_2OH}{|}}{C}}-CH_2\right]_n-OH$$

wherein n is an integer of 1 or more. Furthermore, a hydroxyl group in the above formula sometimes reacts with another hydroxyl group to form an intramolecular or intermolecular ether bond resulting a ring or network structure. Such complicatedly condensed pentaerythritols are also included in the condensation product of the present invention.

The composition of the condensation product varies depending on the degree of the dehydration, namely the degree of the condensation. As a matter of course, when the degree of the dehydration is small, the main product is the low-condensed pentaerythritol, and when the degree is large, the main product is the more complicatedly condensed pentaerythritol.

In order to obtain the condensation product useful as the stabilizer, it is desirable to carry out the condensation reaction so that 3% to 15% by weight of water is dehydrated on the basis of the weight of the starting polyol, although this varies depending on the kind of the starting polyol. Particularly it is important that the obtained condensation product has the hydroxyl content of 20% to 40% by weight. When the hydroxyl content is lower than 20% by weight, the condensation product is a black piceous material and cannot be employed as the stabilizer. When the hydroxyl content is higher than 40% by weight, the condensation product contains large quantities of the unreacted starting polyol and shows the drawbacks of the starting polyol.

The obtained reaction mixture may be pulverized to powder as it is and employed as the stabilizer for chlorine-containing resins, but preferably is washed with a small quantity of water to remove a colored material, catalyst and water-soluble material in the reaction mixture.

The partial esterification products of pentaerythritol, a polypentaerythritol or the above-mentioned condensation product with an aliphatic acid or an aromatic acid also have an excellent effect on the heat stabilization of chlorine-containing resins. The esterification of the above-mentioned polyols is carried out in a usual manner.

It is essential that the aliphatic acids employed for the partial esterification of the polyols are polybasic acids, and aliphatic polybasic acids having 4 or more carbon atoms are employed in the present invention. Examples of the aliphatic polybasic acid employed in the present invention are maleic acid, fumaric acid, itaconic acid, citraconic acid, mesaconic acid, glutaconic acid, tricarballylic acid, succinic acid, glutaric acid, adipic acid, pimelic acid, suberic acid, azelaic acid, sebacic acid, malic acid, tartaric acid, citric acid, 5-norbornen-2,3-dicarboxylic acid, 1,2,3,4-butanetetracarboxylic acid. These aliphatic polybasic acids may be employed alone or in admixture thereof. Also, these aliphatic polybasic acids are employed in the form of ester, acid halide or acid anhydride.

Any of aromatic mono- and poly-basic acids are employed as the aromatic acid. Examples of the aromatic acid employed in the present invention are benzoic acid, o-, m- and p-toluic acids, o-, m- and p-hydroxybenzoic acids, phthalic acid, isophthalic acids, terephthalic acid, hydroxynaphthoic acids, naphthalenedicarboxylic acids, trimellitic acid, and pyromellitic acid. These aromatic carboxylic acids may be employed alone or in admixture thereof. Also, these aromatic carboxylic acids are employed in the form of ester, acid halide and acid anhydride. Particularly, the partial esterification products of the polypentaerythritol or the condensation product show a desirable result.

Among the above-mentioned aliphatic and aromatic acid, the polybasic acids are also employed in combination with higher fatty acids, and the thus obtained partial esterification products can also be employed as the stabilizer for chlorine-containing resins. Examples of the higher fatty acid employed in the present invention are those having 8 or more carbon atoms, particularly 8 to 24 carbon atoms such as caprylic acid, capric acid, lauric acid, palmitic acid, stearic acid, behenic acid, oleic acid, linolic acid, linolenic acid, ricinoleic acid, and coconut oil fatty acid. These higher fatty acids are also employed in the form of ester, acid halide or acid anhydride.

According to the present invention, for instance, in case that two moles of dipentaerythritol is reacted with one mole of adipic acid or terephthalic acid, or a mixture of one mole of adipic acid and one mole of stearic acid, it is considered that the obtained partial esterification products mainly contain those shown by the following structural formulas, respectively.

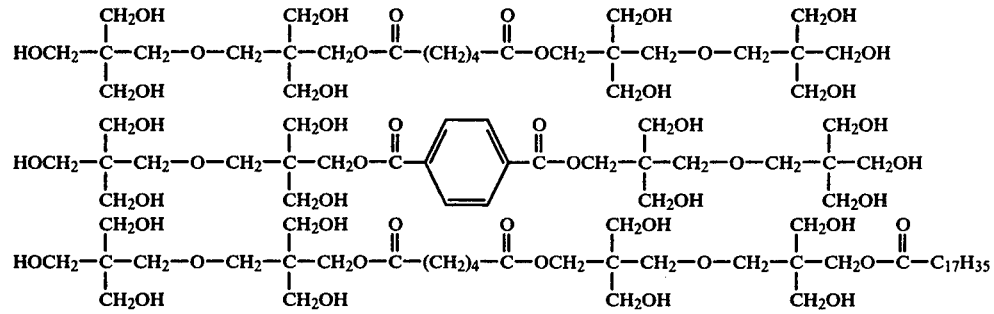

In the present invention, the partial esterification products having the desired hydroxyl content, ester value and melting point can be obtained by suitably changing the molar ration of the polyols to the acid. However, almost completely or completely esterified polyols have little effect on the heat stabilization of chlorine-containing resins. Also, in case pentaerythritol or a polypentaerythritol is employed as the polyol and the degree of esterification is too low, the obtained products show the drawbacks of the polyol per se. It is essential that the hydroxyl content of the esterification product falls within the range of 10% to 40% by weight.

The partial esterification products of the present invention have also the effect of lubricating or plasticizing chlorine-containing resins depending on the degree of the esterification and, therefore, are industrially valuable additives having various useful properties.

The stabilizers of the present invention are applicable to chlorine-containing resins such as polyvinyl chloride, polyvinylidene chloride and copolymers of vinyl chloride and other olefins, and particularly provide polyvinyl chloride with good heat stability. In general, upon processing polyvinyl chloride whose nontoxicity is required, organic zinc salts are employed usually with organic calcium, barium and magnesium salts. The stabilizers of the present invention have the excellent property of promoting the stabilizing effect of these known stabilizers, and are preferably employed in combination with such nontoxic zinc stabilizers. The stabilizers of the present invention may be, of course, employed in combination with lead, cadmium or tin stabilizers with or without the zinc stabilizers, and the combination use with tin stabilizers is also desirable as the low toxic formulation.

The amount of the stabilizers of the present invention to be added to chlorine-containing resins varies depending on the kind and amount of organic metal salts such as organic Ca-Zn, Ba-Zn and Mg-Zn salts stabilizers which are employed in combination with the stabilizers of the present invention. Usually, the stabilizers of the present invention show the effect when employed in an amount of at least 0.1 part by weight to 100 parts by weight of a chlorine-containing resin. The larger the amount employed, the more the time till coloration and blackening is prolonged. In practice, however, the use in an amount of at most 10 parts by weight to 100 parts by weight of a chlorine-containing resin is enough for stabilizing the chlorine-containing resin.

According to the heat durability test of a sheet of a chlorine-containing resin, it was observed that the time till blackening was remarkably extended by the use of the stabilizers of the present invention, while the resin containing no stabilizer of the present invention showed the blackening, opacity and surface deterioration in early stages. It was also observed that the gloss of the sheet surface was not lost and even if blackened, the sheet still had a flexibility. Thus, the stabilizers of the present invention have an excellent effect on the stabilization for chlorine-containing resins.

The stabilizers of the present invention may be, of course, employed in combination with other additives such as other stabilizers to heat and light, plasticizers, lubricants, fillers and pigments.

The present invention is more particularly described and explained by means of the following Examples, in which all parts and % are by weight unless otherwise noted.

EXAMPLES 1 to 5

To 2,000 g. of pentaerythritol were added 4 g. of p-toluenesulfonic acid, 10 g. of phosphoric acid and 34 g. of water, and the mixture was heated. The dehydration condensation was carried out at a temperature of 215° to 230° C. for 1.5 hours with agitation. The water formed by the reaction was 229 g. The reaction mixture was poured into a vat and after cooling, was pulverized to give light brown powder. The thus obtained powder was referred to as "Stabilizer 1". The melting point and hydroxyl content of the Stabilizer 1 were 158° to 180° C. and 33.2%, respectively.

The above procedure was repeated except that the reaction was carried out at a temperature of 210° to 220° C. to give Stabilizer 2.

Also, the same procedure as the case of Stabilizer 1 was repeated except that the reaction mixture was poured into a hot water and the hot water-soluble portion was removed to give Stabilizers 3, 4 and 5, respectively.

The composition, melting point and hydroxyl content of the Stabilizers 1 to 5 obtained in these Examples 1 to 5 are shown in Table 1.

The composition was measured by gas chromatography of silylation products which were obtained by reacting the Stabilizers 1 to 5 with a silylating agent.

Table 1

| Stabilizer No. | Penta-erythritol | Dipenta-erythritol | Tripenta-erythritol | Other condensed pentaerythritols | Melting point | Hydroxyl content |
|---|---|---|---|---|---|---|
| | % | | | | °C. | % |
| 1 | 28.1 | 14.8 | 8.1 | 49.0 | 158–180 | 33.2 |
| 2 | 58.7 | 19.3 | 5.7 | 16.3 | 155–180 | 38.9 |
| 3 | 3.2 | 2.1 | 41.4 | 53.3 | 180–210 | 28.6 |
| 4 | 11.1 | 10.4 | 13.8 | 64.7 | 175–195 | 33.9 |
| 5 | 35.7 | 21.2 | 16.8 | 26.3 | 150–165 | 36.1 |

Heat durability test of a chlorine-containing resin was conducted by employing the Stabilizers 1 to 4 as follows:

To a base composition consisting of 100 parts of polyvinyl chloride, 3 parts of a Ca-Zn complex stabilizer and 3 parts of an epoxide soybean oil was added 2 parts of the stabilizer of the present invention to 100 parts of polyvinyl chloride. The composition was kneaded by rolls at a temperature of 190° to 200° C. for 5 minutes, and was formed to a sheet having a thickness of 1 mm. The sheet was placed in an oven at 190° C., and coloration and appearance were observed by taking out the sheet at intervals of 10 minutes (Test Nos. 1 to 4).

As a Control, the heat durability test of a sheet prepared from the above-mentioned base composition was also conducted.

Further, the same heat durability test was conducted with respect to the case where 2 parts of dipentaerythritol was employed instead of 2 parts of the stabilizer of the present invention (Comparative Test No. 1).

The results of the heat durability test are shown in Table 2.

Table 2

| Test No. | Stabilizer | 0 | 10 | 20 | 30 | 40 | 50 | 60 | 70 | 80 | 90 | 100 | 110 | Appearance of sheet after 110 minutes |
|---|---|---|---|---|---|---|---|---|---|---|---|---|---|---|
| Control | — | A | A | B | B | B | B | C | H | | | | | opaque |
| Com. Test 1 | Dipenta-erythritol | A | A | B | B | B | D | E | F | F | G | G | H | opaque, white points |
| Test 1 | Stabilizer 1 | A | A | B | B | B | D | D | E | F | F | F | G | translucent |
| Test 2 | Stabilizer 2 | A | A | B | B | B | D | E | E | F | F | G | G | translucent |
| Test 3 | Stabilizer 3 | A | A | B | B | B | D | D | D | E | F | F | G | translucent |
| Test 4 | Stabilizer 4 | A | A | B | B | B | D | E | E | F | F | G | G | translucent |

(Note)
A: Light yellow
B: Yellow
C: Black yellow
D: Orange
E: Red
F: Dark red
G: Black red
H: Black (blackening)

As shown in Table 2, the time till blackening of the sheet containing the stabilizer of the invention is far longer than that of the sheet of Control, and the heat stability of the sheets containing the stabilizer of the invention is superior to that of the sheet of Comparative Test No. 1 to which dipentaerythritol is added instead of the stabilizer of the invention. From these results, it is clear that the stabilizers of the present invention have a good compatibility with a chlorine-containing resin and effectively inhibit the blackening and deterioration of the resin.

Relationship between the amount of the stabilizer and the heat stability was also observed by conducting the heat durability test in the same manner by employing varied amounts of the Stabilizer 5 (Test Nos. 5 to 9).

The results of the heat durability test are shown in Table 3 together with the results of Control andf Comparative Test No. 1.

EXAMPLES 6 TO 16

To 127 g. (0.5 mole) of dipentaerythritol was added 36.5 g. (0.25 mole) of adipic acid, and the mixture was heated. The esterification was carried out at a temperature of 180° to 235° C. for 2 hours with agitation. The amount of the water formed by the esterification was 8.8 g. The resulting reaction mixture was poured into a vat and after cooling, was pulverized to give white powder. The thus obtained powder was referred to as "Stabilizer 6". The melting point and hydroxyl content of the Stabilizer 6 were 110° to 178° C. and 26.4%, respectively. The Stabilizer 6 also had an ester value of 178 and an acid value of 0.7.

The above procedures were repeated except that the polyols and the aliphatic polybasic acids shown in Table 4 were employed, to give Stabilizers 7 to 16.

The polyol and acid components and the hydroxyl content of the Stabilizers 6 to 16 obtained in these Examples 6 to 16 are shown in Table 4.

Table 3

| Test No. | Stabilizer Name | Amount part | 0 | 10 | 20 | 30 | 40 | 50 | 60 | 70 | 80 | 90 | 100 | 110 | 120 | 130 | 140 | 150 |
|---|---|---|---|---|---|---|---|---|---|---|---|---|---|---|---|---|---|---|
| | | | | | | | | | | minute | | | | | | | | |
| Control | — | — | A | A | B | B | B | B | C | H | | | | | | | | |
| Com. Test 1 | Dipenta-erythritol | 2 | A | A | B | B | B | D | E | F | F | G | G | H | | | | |
| Test 5 | Stabilizer 5 | 0.5 | A | A | B | B | B | B | D | G | H | | | | | | | |
| Test 6 | Stabilizer 5 | 1 | A | A | B | B | B | D | E | F | G | G | H | | | | | |
| Test 7 | Stabilizer 5 | 2 | A | A | B | B | B | D | E | F | F | F | G | G | H | | | |
| Test 8 | Stabilizer 5 | 3 | A | B | B | B | D | E | E | F | F | F | F | G | G | G | G | H |
| Test 9 | Stabilizer 5 | 5 | B | D | D | E | E | E | E | E | E | F | F | F | F | F | F | F |

(Note)
A: Light yellow,
B: Yellow,
C: Black yellow,
D: Orange
E: Red,
F: Dark red,
G: Black red,
H: Black (blackening)

In Table 3, the reason why the coloration in early stages is observed in Test Nos. 8 and 9 is that the kneading on rolls was carried out at a temperature of 200° to 210° C. for Test No. 8 and at a temperature of 210° to 220° C. for Test No. 9, because the lubricity of these compositions were high.

As is clear from Table 3, the time till blackening is prolonged with increase of the amount added of the stabilizer of the present invention.

Table 4

| Stabilizer No. | Polyol (I) | Aliphatic poly-basic acid (II) | Molar ratio of (I) to (II) | Hydroxyl content (%) |
|---|---|---|---|---|
| 6 | Dipentaerythritol | Adipic acid | 2 | 26.4 |
| 7 | Dipentaerythritol | Sebacic acid | 2 | 24.0 |
| 8 | Dipentaerythritol | Maleic acid | 2 | 27.0 |
| 9 | Dipentaerythritol | Itaconic acid | 2 | 26.4 |
| 10 | Dipentaerythritol | Malic acid | 2 | 27.1 |
| 11 | Dipentaerythritol | Tartaric acid | 2 | 30.8 |
| 12 | Dipentaerythritol | Citric acid | 3 | 27.6 |
| 13 | Pentaerythritol | Adipic acid | 2 | 24.2 |
| 14 | Tripentaerythritol | Adipic acid | 2 | 27.0 |
| 15 | Condensation product of pentaerythritol* | Adipic acid | 2*** | 19.1 |
| 16 | Condensation product of pentaerythritol** | Adipic acid | 2*** | 16.3 |

(Note)
*The same as Stabilizer 1
**The same as Stabilizer 4
***Weight ratio of (I) to (II)

The heat durability test (Test Nos. 1 to 11) of a chlorine-containing resin was conducted by employing the Stabilizers 6 to 16 (2 parts to 100 parts of polyvinyl chloride) and the base composition consisting of 100 parts of polyvinyl chloride, 3 parts of a Ca-Zn complex stabilizer and 3 parts of an epoxide soybean oil in the same manner as in Examples 1 to 5.

The results of the heat durability test are shown in Table 5 together with the results of Control and Comparative Test No. 1.

Table 5

| Test No. | Stabilizer | 0 | 10 | 20 | 30 | 40 | 50 | 60 | 70 | 80 | 90 | 100 | 110 | Appearance of sheet after 110 minutes |
|---|---|---|---|---|---|---|---|---|---|---|---|---|---|---|
| Control | — | A | A | B | B | B | B | C | H | | | | | opaque |
| Com. Test 1 | Dipenta-erythritol | A | A | B | B | B | D | E | F | F | G | G | H | opaque, white points |
| Test 1 | Stabilizer 6 | A | A | B | B | B | D | D | E | E | E | E | F | translucent |
| Test 2 | Stabilizer 7 | A | A | B | B | B | B | D | D | E | E | E | F | translucent |
| Test 3 | Stabilizer 8 | A | A | B | B | B | D | D | D | E | E | E | F | translucent |
| Test 4 | Stabilizer 9 | A | A | B | B | B | D | D | E | E | E | F | F | translucent |
| Test 5 | Stabilizer 10 | A | A | B | B | B | D | D | E | E | E | E | F | translucent |
| Test 6 | Stabilizer 11 | A | A | B | B | B | D | D | D | E | E | E | F | translucent |
| Test 7 | Stabilizer 12 | A | A | B | B | B | D | D | D | E | E | E | F | translucent |
| Test 8 | Stabilizer 13 | A | A | B | B | D | D | E | E | G | G | H | | opaque |
| Test 9 | Stabilizer 14 | A | A | B | B | B | D | D | E | E | E | F | F | translucent |
| Test 10 | Stabilizer 15 | A | A | B | B | B | D | D | E | E | F | G | G | a little opaque |
| Test 11 | Stabilizer 16 | A | A | B | B | B | D | D | D | E | F | G | G | a little opaque |

(Note)
A: Light yellow
B: Yellow
C: Black yellow
D: Orange
E: Red
F: Dark red
G: Black red
H: Black (blackening)

As shown in Table 5, the time till blackening of the sheets containing the stabilizers of the invention is far longer than that of the sheet of Control, and the heat stability of the sheets containing the stabilizers of the invention is superior to that of the sheet of Comparative Test No. 1 to which dipentaerythritol is added instead of the stabilizer of the invention. From these results, it is clear that the stabilizers of the present invention have a good compatibility with a chlorine-containing resin and effectively prevent the coloration and deterioration of the resin.

Relationship between the amount of the stabilizer and the heat stability was observed by conducting the heat durability test in the same manner by employing varied amounts of the Stabilizer 6 (Test Nos. 12 to 15). As a comparison, the heat durability test was conducted at the same time in the same manner except for employing varied amounts of dipentaerythritol (Comparative Test Nos. 2 to 4).

These results are shown in Table 6.

Table 6

| Test No. | Stabilizer Name | Amount part | 0 | 10 | 20 | 30 | 40 | 50 | 60 | 70 | 80 | 90 | 100 | 110 | 120 | 130 | 140 | 150 |
|---|---|---|---|---|---|---|---|---|---|---|---|---|---|---|---|---|---|---|
| Control | — | — | A | A | B | B | B | B | C | H | | | | | | | | |
| Com. Test 2 | Dipenta-erythritol | 1 | A | A | B | B | B | D | E | F | G | H | | | | | | |
| Com. Test 3 | Dipenta-erythritol | 2 | A | A | B | B | B | D | E | F | F | G | G | H | | | | |
| Com. Test 4 | Dipenta-erythritol | 3 | A | A | B | B | B | D | F | F | F | G | G | G | G | H | | |
| Test 12 | Stabilizer 6 | 0.5 | A | A | B | B | B | B | D | E | G | H | | | | | | |
| Test 13 | Stabilizer 6 | 1 | A | A | B | B | B | B | D | E | F | G | G | H | | | | |
| Test 14 | Stabilizer 6 | 2 | A | A | B | B | B | D | D | E | E | E | E | F | F | G | G | H |
| Test 15 | Stabilizer 6 | 3 | A | A | B | B | B | D | D | D | E | E | E | E | E | F | F | F |

(Note)
A: Light yellow
B: Yellow
C: Black yellow
D: Orange
E: Red
F: Dark red
G: Black red
H: Black (blackening)

As is clear from Table 6, the time till blackening is prolonged with increase of the amount added of the stabilizer of the present invention. The sheet of Test No. 15 was translucent (dark red) and had a gloss and a flexibility, even after placing in an oven at 190° C. for 150 minutes.

The heat durability test was further conducted in the same manner by employing 2 parts of Stabilizer 6 to 100 parts of polyvinyl chloride and a different base composition consisting of 100 parts of polyvinyl chloride, 2 parts of a Ca-Zn stabilizer, 1 part of a tin stabilizer, 2 parts of an epoxide soybean oil and 0.5 part of a lubricant (Test No. 16).

The result is shown in Table 7 together with the result of Control which was conducted by employing only the above base composition.

Table 7

| Test No. | 0 | 10 | 20 | 30 | 40 | 50 | 60 | 70 | 80 | 90 | 100 | 110 | 120 |
|---|---|---|---|---|---|---|---|---|---|---|---|---|---|
| Control | A | A | B | B | B | B | B | C | H | | | | |
| Test 16 | A | A | B | B | B | B | D | D | E | E | E | F | F |

(Note)
A: Light yellow
B: Yellow
C: Black yellow
D: Orange
E: Red
F: Dark red
H: Black (blackening)

EXAMPLES 17 TO 29

A flask equipped with a distillation apparatus was charged with 76.2 g. (0.3 mole) of dipentaerythritol and 24.9 g. (0.15 mole) of terephthalic acid, and was heated to melt the content with agitation. The reaction was carried out at a temperature of 240° to 260° C., until no water formed by the esterification was distilled away. The reaction time was 2 hours and the amount of the water distilled away was 5.3 g. After cooling the reaction mixture, the obtained esterification product of dipentaerythritol and terephthalic acid was pulverized to give white powder. The thus obtained powder was referred to as "Stabilizer 17". The melting point and hydroxyl content of the Stabilizer 17 were 155° to 188° C. and 25.1%, respectively. The Stabilizer 17 also had an ester value of 170 and an acid value of 0.7.

The above procedures were repeated except that the polyols and the aromatic carboxylic acids shown in Table 8 were employed, to give Stabilizers 18 to 29.

The polyol and acid components and the hydroxyl content of the Stabilizers 17 to 29 obtained in these Examples 17 to 29 are shown in Table 8.

Table 8

| Stabilizer No. | Polyol (I) | Aromatic carboxylic acid (II) | Molar ratio of (I) to (II) | Hydroxyl content (%) |
|---|---|---|---|---|
| 17 | Dipentaerythritol | Terephthalic acid | 2 | 25.1 |
| 18 | Dipentaerythritol | Benzoic acid | 1 | 22.6 |
| 19 | Dipentaerythritol | p-Toluic acid | 1 | 22.2 |
| 20 | Dipentaerythritol | p-Hydroxybenzoic acid | 1 | 30.4 |
| 21 | Dipentaerythritol | Phthalic acid | 2 | 24.8 |
| 22 | Dipentaerythritol | Isophthalic acid | 2 | 29.0 |
| 23 | Dipentaerythritol | Trimellitic anhydride | 2 | 23.3 |
| 24 | Dipentaerythritol | Pyromellitic acid | 2 | 28.4 |
| 25 | Dipentaerythritol | Equimolar mixture of benzoic acid and terephthalic acid | 1.5 | 23.7 |
| 26 | Tripentaerythritol | Terephthalic acid | 2 | 23.9 |
| 27 | Mixture of di- and tri-pentaerythritols (2:1 by mole) | Terephthalic acid | 2 | 25.3 |
| 28 | Condensation product of pentaerythritol* | Terephthalic acid | 3*** | 22.9 |
| 29 | Condensation product of pentaerythritol** | Terephthalic acid | 3*** | 21.9 |

(Note)
*The same as Stabilizer 1
**The same as Stabilizer 4
***Weight ratio of (I) to (II)

The heat durability test (Test Nos. 1 to 13) was conducted by employing the Stabilizers 17 to 29 (2 parts to 100 parts of polyvinyl chloride) and the base composition consisting of 100 parts of polyvinyl chloride, 3 parts of a Ca-Zn complex stabilizer and 3 parts of an epoxide soybean oil in the same manner as in Examples 1 to 5.

Also, the same heat durability test was conducted as a Comparative Test No. 5 except that the esterification product of pentaerythritol and terephthalic acid (2:1 by mole) having the hydroxyl content of 22.5% was employed instead of the stabilizer obtained in these Examples.

The results of the heat durability test (Test Nos. 1 to 13) are shown in Table 9 together with the results of Control and Comparative Test Nos. 1 and 5.

Table 9

| Test No. | Stabilizer | 0 | 10 | 20 | 30 | 40 | 50 | 60 | 70 | 80 | 90 | 100 | 110 | Appearance of sheet after 110 minutes |
|---|---|---|---|---|---|---|---|---|---|---|---|---|---|---|
| Control | — | A | A | B | B | B | B | C | H | | | | | opaque |
| Com. Test 1 | Dipentaerythritol | A | A | B | B | B | D | E | F | F | G | G | H | opaque, white points |
| Com. Test 5 | Reaction product of pentaerythritol and terephthalic acid (2:1 by mole) | A | A | B | B | B | D | D | E | F | G | G | H | opaque |
| Test 1 | Stabilizer 17 | A | A | B | B | B | D | D | D | E | E | E | F | translucent |
| Test 2 | Stabilizer 18 | A | A | B | B | B | D | D | E | F | G | G | G | a little opaque |
| Test 3 | Stabilizer 19 | A | A | B | B | B | D | E | E | F | G | G | G | a little opaque |
| Test 4 | Stabilizer 20 | A | A | B | B | D | D | D | E | E | F | G | G | a little opaque |
| Test 5 | Stabilizer 21 | A | A | B | B | B | D | D | D | E | F | F | G | translucent |

Table 9-continued

| Test No. | Stabilizer | 0 | 10 | 20 | 30 | 40 | 50 | 60 | 70 | 80 | 90 | 100 | 110 | Appearance of sheet after 110 minutes |
|---|---|---|---|---|---|---|---|---|---|---|---|---|---|---|
| Test 6 | Stabilizer 22 | A | A | B | B | B | D | D | D | E | E | E | F | translucent |
| Test 7 | Stabilizer 23 | A | A | B | B | B | D | D | E | E | F | F | G | a little opaque |
| Test 8 | Stabilizer 24 | A | A | B | B | B | D | D | D | E | F | F | G | translucent |
| Test 9 | Stabilizer 25 | A | A | B | B | B | D | D | D | E | F | F | G | translucent |
| Test 10 | Stabilizer 26 | A | A | B | B | B | D | D | D | E | E | F | F | translucent |
| Test 11 | Stabilizer 27 | A | A | B | B | B | D | D | D | E | E | F | F | translucent |
| Test 12 | Stabilizer 28 | A | A | B | B | B | D | D | E | E | F | F | G | translucent |
| Test 13 | Stabilizer 29 | A | A | B | B | B | D | D | D | E | F | F | G | translucent |

(Note)
A: Light yellow
B: Yellow
C: Black yellow
D: Orange
E: Red
F: Dark red
G: Black red
H: Black (blackening)

As is clear from Table 9, the heat stability of the sheets containing the stabilizers of the present invention is far superior to that of the sheet of Control, and also is superior to that of the sheets of Comparative Test Nos. 1 and 5. The stabilizers of the present invention effectively prevent the coloration and deterioration of polyvinyl chloride.

Relationship between the amount of the stabilizer and the heat stability was observed by conducting the heat durability test in the same manner by employing varied amounts of the Stabilizer 17 (Test Nos. 14 to 19).

The results are shown in Table 10 together with the results of Control and the comparative tests which were conducted in the same manner by employing varied amounts of dipentaerythritol (Comparative Test Nos. 2 to 4 and 6).

As is clear from Table 10, the time till blackening is prolonged with increase of the amount added of the stabilizer of the present invention. The sheet of Test No. 19 was translucent (dark red) and had a gloss and a flexibility, even after placing in an oven at 190° C. for 150 minutes.

The heat durability test was further conducted in the same manner by employing 2 parts of the Stabilizer 17 to 100 parts of polyvinyl chloride and a different base composition consisting of 100 parts of polyvinyl chloride, 2 parts of a Ca-Zn stabilizer, 1 part of a tin stabilizer, 2 parts of an epoxide soybean oil and 0.5 part of a lubricant (Test No. 20).

The result is shown in Table 11 together with the result of Control which was conducted by employing only the above base composition.

Table 10

| Test No. | Stabilizer Name | Amount part | 0 | 10 | 20 | 30 | 40 | 50 | 60 | 70 | 80 | 90 | 100 | 110 | 120 | 130 | 140 | 150 |
|---|---|---|---|---|---|---|---|---|---|---|---|---|---|---|---|---|---|---|---|
| Control | — | — | A | A | B | B | B | B | C | H | | | | | | | | |
| Com. Test 2 | Dipentaerythritol | 1 | A | A | B | B | B | D | E | F | G | H | | | | | | |
| Com. Test 3 | Dipentaerythritol | 2 | A | A | B | B | B | D | E | F | F | G | G | H | | | | |
| Com. Test 4 | Dipentaerythritol | 3 | A | A | B | B | B | D | F | F | F | G | G | G | G | H | | |
| Com. Test 6 | Dipentaerythritol | 5 | A | A | B | B | B | D | F | F | F | G | G | G | G | H | | |
| Test 14 | Stabilizer 17 | 0.2 | A | A | B | B | B | D | E | F | G | H | | | | | | |
| Test 15 | Stabilizer 17 | 0.5 | A | A | B | B | B | D | E | F | F | G | H | | | | | |
| Test 16 | Stabilizer 17 | 1 | A | A | B | B | B | D | D | D | E | F | F | G | G | H | | |
| Test 17 | Stabilizer 17 | 2 | A | A | B | B | B | D | D | D | E | E | E | F | F | G | G | H |
| Test 18 | Stabilizer 17 | 3 | A | A | B | B | B | D | D | D | D | E | E | E | F | F | F | G |
| Test 19 | Stabilizer 17 | 5 | A | A | B | B | B | B D | D | D | D | D | E | E | E | E | E | |

Note
A: Light yellow
B: Yellow
C: Black yellow
D: Orange
E: Red
F: Dark red
G: Black red
H: Black (blackening)

Table 11

| Test No. | 0 | 10 | 20 | 30 | 40 | 50 | 60 | 70 | 80 | 90 | 100 | 110 | 120 |
|---|---|---|---|---|---|---|---|---|---|---|---|---|---|
| Control | A | A | B | B | B | B | B | C | H | | | | |

Table 11-continued

| Test No. | Time elapsed (minute) | | | | | | | | | | | | |
|---|---|---|---|---|---|---|---|---|---|---|---|---|---|
| | 0 | 10 | 20 | 30 | 40 | 50 | 60 | 70 | 80 | 90 | 100 | 110 | 120 |
| Test 20 | A | A | B | B | B | B | D | D | E | E | E | F | F |

(Note)
A: Light yellow
B: Yellow
C: Black yellow
D: Orange
E: Red
F: Dark red
H: Black (blackening)

EXAMPLES 30 TO 43

To 254 g. (1 mole) of dipentaerythritol were added 73 g. (0.5 mole) of adipic acid and 142 g. (0.5 mole) of stearic acid, and the mixture was heated. The esterification was carried out at a temperature of 180° to 230° C. for 2 hours with agitation. The amount of the water formed by the esterification was 26.4 g. The resulting reaction mixture was poured into a vat and after cooling, was pulverized at room temperature to give white powder. The thus obtained powder is referred to as "Stabilizer 30". The melting point and hydroxyl content of the Stabilizer 30 were 100° to 160° C. and 17.1%, respectively. The Stabilizer 30 also had an ester value of 188 and an acid value of 0.8.

The above procedures were repeated except that the polyols, the polybasic acids and the fatty acids shown in Table 12 were employed, to give Stabilizers 31 to 43.

The polyol and acid components and the hydroxyl content of the Stabilizers 30 to 43 obtained in these Examples 30 to 43 are shown in Table 12.

Table 12

| Stabilizer No. | Polyol | | Polybasic acid | | Fatty acid | | Hydroxyl content % |
|---|---|---|---|---|---|---|---|
| | Kind | Amount mole | Kind | Amount mole | Kind | Amount mole | |
| 30 | Dipentaerythritol | 1 | Adipic acid | 0.5 | Stearic acid | 0.5 | 17.1 |
| 31 | Pentaerythritol | 1 | Adipic acid | 0.5 | Stearic acid | 0.5 | 13.0 |
| 32 | Dipentaerythritol | 1 | Adipic acid | 0.5 | Capric acid | 0.5 | 20.5 |
| 33 | Dipentaerythritol | 1 | Adipic acid | 0.5 | Lauric acid | 0.5 | 19.0 |
| 34 | Dipentaerythritol | 1 | Adipic acid | 0.5 | Oleic acid | 0.5 | 17.0 |
| 35 | Dipentaerythritol | 1 | Adipic acid | 0.5 | Behenic acid | 0.5 | 16.0 |
| 36 | Dipentaerythritol | 1 | Malic acid | 0.5 | Stearic acid | 0.5 | 19.3 |
| 37 | Dipentaerythritol | 1.5 | Citric acid | 0.5 | Stearic acid | 0.5 | 21.8 |
| 38 | Dipentaerythritol | 1 | Terephthalic acid | 0.5 | Stearic acid | 0.5 | 16.8 |
| 39 | Tripentaerythritol | 1 | Adipic acid | 0.5 | Stearic acid | 0.5 | 19.5 |
| 40 | Condensation product of pentaerythritol | (1)* | Adipic acid | 0.5 | Stearic acid | 0.5 | 13.6 |
| 41 | Condensation product of pentaerythritol | (1)** | Adipic acid | 0.5 | Stearic acid | 0.5 | 11.7 |
| 42 | Dipentaerythritol | 1 | Adipic acid | 0.5 | Stearic acid | 0.25 | 21.3 |
| 43 | Dipentaerythritol | 1.5 | Adipic acid | 0.5 | Stearic acid | 0.5 | 22.2 |

(Note)
*This condensation product is the same as the Stabilizer 1 and the mole number was calculated as dipentaerythritol.
**This condensation product is the same as the Stabilizer 4 and the mole number was calculated as dipentaerythritol.

The heat durability test (Test Nos. 1 to 14) was conducted by employing the Stabilizers 30 to 43 (2 parts to 100 parts of polyvinyl chloride) and the base composition consisting of 100 parts of polyvinyl chloride, 3 parts of a Ca-Zn complex stabilizer and 3 parts of an epoxide soybean oil in the same manner as in Examples 1 to 5.

The results of the heat durability test (Test Nos. 1 to 14) are shown in Table 13 together with the results of Control and Comparative Test No. 1.

Table 13

| Test No. | Stabilizer | Time elapsed (minute) | | | | | | | | | | | | Appearance of sheet after 110 minutes |
|---|---|---|---|---|---|---|---|---|---|---|---|---|---|---|
| | | 0 | 10 | 20 | 30 | 40 | 50 | 60 | 70 | 80 | 90 | 100 | 110 | |
| Control | 1 | A | A | B | B | B | B | C | H | | | | | opaque |
| Com. Test 1 | Dipenta-erythritol | A | A | B | B | B | D | E | F | F | G | G | H | opaque, white points |
| Test 1 | Stabilizer 30 | A | A | B | B | B | D | D | D | E | E | F | F | translucent |
| Test 2 | Stabilizer 31 | A | A | B | B | B | D | E | E | G | G | H | | opaque |
| Test 3 | Stabilizer 32 | A | A | B | B | B | D | D | E | E | F | F | G | a little opaque |
| Test 4 | Stabilizer 33 | A | A | B | B | B | D | D | E | E | F | F | G | a little opaque |
| Test 5 | Stabilizer 34 | A | A | B | B | D | D | D | E | E | F | F | | translucent |
| Test 6 | Stabilizer 35 | A | A | B | B | B | D | D | E | E | F | F | G | a little opaque |
| Test 7 | Stabilizer 36 | A | A | B | B | B | D | D | D | E | E | F | F | translucent |
| Test 8 | Stabilizer 37 | A | A | B | B | B | D | D | D | E | E | F | F | translucent |
| Test 9 | Stabilizer 38 | A | A | B | B | B | D | D | D | E | E | F | F | translucent |
| Test 10 | Stabilizer 39 | A | A | B | B | B | D | D | D | E | E | F | F | translucent |
| Test 11 | Stabilizer 40 | A | A | B | B | B | D | D | E | E | F | F | G | a little opaque |
| Test 12 | Stabilizer 41 | A | A | B | B | B | D | D | D | E | E | F | G | a little opaque |
| Test 13 | Stabilizer 42 | A | A | B | B | B | D | D | D | E | E | F | F | translucent |

Table 13-continued

| Test No. | Stabilizer | Time elapsed (minute) | | | | | | | | | | | Appearance of sheet after 110 minutes |
|---|---|---|---|---|---|---|---|---|---|---|---|---|---|
| | | 0 | 10 | 20 | 30 | 40 | 50 | 60 | 70 | 80 | 90 | 100 | 110 | |
| Test 14 | Stabilizer 43 | A | A | B | B | B | D | D | D | E | E | F | F | translucent |

(Note)
A: Light yellow
B: Yellow
C: Black yellow
D: Orange
E: Red
F: Dark red
G: Black red
H: Black (blackening)

As is clear from Table 13, the heat stability of the sheets containing the stabilizers of the present invention is far superior to that of the sheet of Control, and also is superior to that of the sheet of Comparative Test No. 1. The stabilizers of the present invention have a good compatibility with polyvinyl chloride and effectively prevent the coloration and deterioration of polyvinyl chloride.

Relationship between the amount of the stabilizer and the heat stability was observed by conducting the heat durability test in the same manner by employing varied amounts of the Stabilizer 30 (Test Nos. 15 to 18).

The results are shown in Table 14 together with the results of Control and Comparative Test Nos. 2 to 4.

Table 14

| Test No. | Stabilizer | | Time elapsed | | | | | | | | | | | | | | |
|---|---|---|---|---|---|---|---|---|---|---|---|---|---|---|---|---|---|
| | Name | Amount part | 0 | 10 | 20 | 30 | 40 | 50 | 60 | 70 | 80 | 90 | 100 | 110 | 120 | 130 | 140 | 150 |
| | | | | | | | | | | | | | minute | | | | | |
| Control | — | — | A | A | B | B | B | B | C | H | | | | | | | | |
| Com. Test 2 | Dipenta-erythritol | 1 | A | A | B | B | B | D | E | F | G | H | | | | | | |
| Com. Test 3 | Dipenta-erythritol | 2 | A | A | B | B | B | D | E | F | F | G | G | H | | | | |
| Com. Test 4 | Dipenta-erythritol | 3 | A | A | B | B | B | D | F | F | F | G | G | G | G | H | | |
| Test 15 | Stabilizer 30 | 0.5 | A | A | B | B | B | B | D | E | G | H | | | | | | |
| Test 16 | Stabilizer 30 | 1 | A | A | B | B | B | B | D | E | F | G | G | H | | | | |
| Test 17 | Stabilizer 30 | 2 | A | A | B | B | B | D | D | D | E | E | F | F | F | G | G | H |
| Test 18 | Stabilizer 30 | 3 | A | A | B | B | B | D | D | D | E | E | E | E | E | F | F | F |

(Note)
A: Light yellow
B: Yellow
C: Black yellow
D: Orange
E: Red
F: Dark red
G: Black red
H: Black (blackening)

As is clear from Table 14, the time till blackening is prolonged with increase of the amount added of the stabilizer of the present invention. The sheet of Test No. 18 was translucent (dark red) and had a gloss and a flexibility, even after placing in an oven at 190° C. for 150 minutes.

What we claim is:

1. A chlorine-containing resin consisting essentially of:
   (1) a chlorine-containing resin selected from the group consisting of homopolymer of vinyl chloride, homopolymer of vinylidene chloride and copolymers of vinyl chloride and an olefin copolymerizable therewith,
   (2) 0.1 to 10 parts by weight, to 100 parts by weight of said chlorine-containing resin, of a heat stabilizer selected from the group consisting of (a) a partial esterification product of a polyol and an aliphatic acid, having a hydroxyl content of 10% to 40% by weight, said polyol being a member selected from the group consisting of pentaerythritol, polypentaerythritols and their dehydration condensation products, and said aliphatic acid being a member selected from the group consisting of aliphatic polycarboxylic acids and their esters, acid halides and acid anhydrides and (b) a partial esterification product of a polyol and an aromatic acid, having a hydroxyl content of 10% to 40% by weight, said polyol being a member selected from the group consisting of polypentaerythritols and dehydration condensation products of pentaerythritol and/or polypentaerythritols, and said aromatic acid being a member selected from the group consisting of aromatic polycarboxylic acids and their esters, acid halides and acid anhydrides, and
   (3) an organic acid zinc salt.

2. The chlorine-containing resin of claim 1, wherein said polyol is a member selected from the group consisting of polypentaerythritols and dehydration condensation products of pentaerythritol and/or polypentaerythritols.

3. The chlorine-containing resin of claim 2, wherein said polyol is dipentaerythritol or tripentaerythritol.

4. The chlorine-containing resin of claim 1, wherein said heat stabilizer is the partial esterification product (a) and said aliphatic polycarboxylic acid is a member selected from the group consisting of maleic acid, fumaric acid, itaconic acid, citraconic acid, mesaconic acid, glutaconic acid, tricarballylic acid, succinic acid, glutaric acid, adipic acid, pimelic acid, suberic acid, azelaic acid, sebacic acid, 5-norbornen-2,3-dicarboxylic acid and 1,2,3,4-butanetetracarboxylic acid.

5. The chlorine-containing resin of claim 4, wherein said partial esterification product is that of pentaerythritol and adipic acid.

6. The chlorine-containing resin of claim 4, wherein said partial esterification product is that of dipentaerythritol and adipic acid.

7. The chlorine-containing resin of claim 1, wherein said heat stabilizer is the partial esterification product (b) and said aromatic polycarboxylic acid is a member selected from the group consisting of phthalic acid, isophthalic acid, terephthalic acid, naphthalenedicarboxylic acids, trimellitic acid and pyromellitic acid.

8. The chlorine-containing resin of claim 7, wherein said partial esterification product is that of dipentaerythritol and phthalic acid.

9. The chlorine-containing resin of claim 7, wherein said partial esterification product is that of dipentaerythritol and isophthalic acid.

10. The chlorine-containing resin of claim 7, wherein said partial esterification product is that of dipentaerythritol and terephthalic acid.

11. The chlorine containing resin of claim 1 which further includes one or more of an organic acid metal salt of a metal or metals selected from the group consisting of lead, calcium, tin, cadmium, barium and magnesium.

* * * * *